Feb. 14, 1933.  O. H. HANSEN  1,897,665
CAN FILLING MACHINE
Filed Feb. 1, 1929   4 Sheets-Sheet 1

Inventor
O. H. Hansen
by W. H. Lieber
Attorney

Feb. 14, 1933. O. H. HANSEN 1,897,665
CAN FILLING MACHINE
Filed Feb. 1, 1929 4 Sheets-Sheet 2

Inventor
O. H. Hansen
by W H Lieber
Attorney

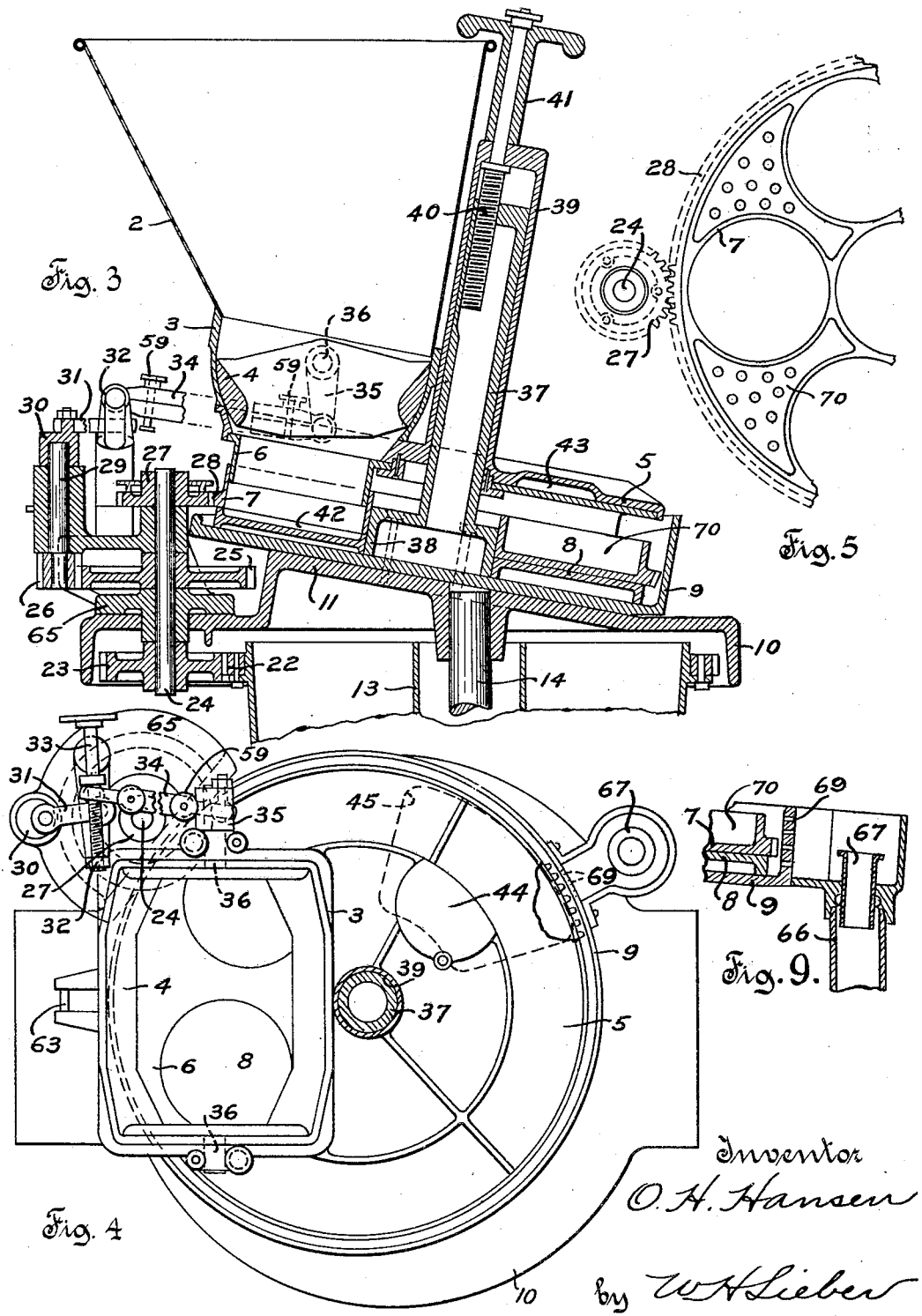

Feb. 14, 1933.   O. H. HANSEN   1,897,665
CAN FILLING MACHINE
Filed Feb. 1, 1929   4 Sheets-Sheet 4

Inventor
O. H. Hansen
by W H Lieber
Attorney

Patented Feb. 14, 1933

1,897,665

UNITED STATES PATENT OFFICE

OSWALD H. HANSEN, OF CEDARBURG, WISCONSIN, ASSIGNOR TO HANSEN CANNING MACHINERY CORPORATION, OF CEDARBURG, WISCONSIN, A CORPORATION OF WISCONSIN

CAN FILLING MACHINE

Application filed February 1, 1929. Serial No. 336,724.

The present invention relates in general to improvements in the art of measuring and feeding material, and relates more specifically to improvements in the construction and operation of machines for automatically measuring successive equal batches of semifluent substance such as a mixture of peeled tomatoes and juice, and for subsequently delivering the measured batches to receptacles such as tin cans.

An object of the invention is to provide a new and useful can filling machine which is extremely simple and compact in construction, and which is adapted to rapidly and effectively measure successive equal batches of material such as a mixture of peeled whole tomatoes and juice, and to subsequently deliver the measured batches to successive receptacles of a series. Another object of the invention is to provide improved mechanism which is adapted to accurately measure substances such as whole peeled tomatoes and juice, without undesirably crushing the tomatoes and destroying the seed cells. A further object of the invention is to provide an improved tomato filler which will not only pack the product in a more sanitary manner, but which will also produce a pack which is superior to that resulting from hand packing. Still another object of the invention is to provide a mechanism for producing successive measured batches of mixed whole tomatoes and juice having constant proportions of ingredients. Another object of the invention is to provide various improvements in the details of construction and operation of can filling machines whereby the cost thereof is reduced to a minimum, and which will facilitate assembly and dismantling of such machines. These and other objects and advantages will appear from the following description.

A clear conception of an embodiment of the invention and of the mode of constructing and of operating mechanisms built in accordance therewith, may be had by referring to the drawings accompanying and forming a part of this specification in which like reference characters designate the same or similar parts in the various views.

Fig. 3 is an enlarged sectional view of the uppermost portion of the improved tomato filler.

Fig. 4 is an enlarged top view of a portion of the feeding and measuring mechanism of the improved tomato filler.

Fig. 5 is a fragmentary top view of a part of the measuring pocket drive of the improved tomato filler.

Fig. 9 is a sectional fragment of the overflow.

Figure 1:
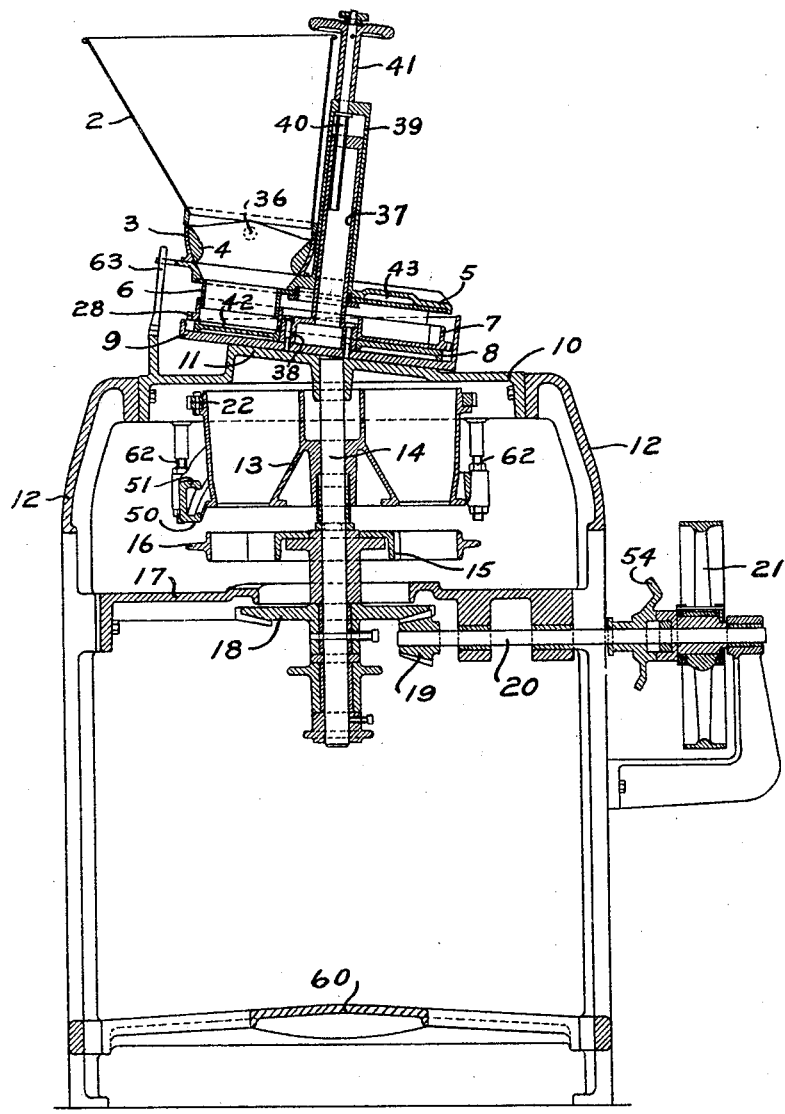
Fig. 1 is a central vertical section through an improved tomato filler, the section being taken through the material supply hopper.

The improved can filling machine comprises in general material measuring mechanism located at the top of the machine, material delivery mechanism located beneath the measuring mechanism, can transporting mechanism disposed beneath the measuring and delivery mechanisms, means for driving the movable elements of the machine, and suitable frame structure for supporting the various mechanisms and elements.

The material measuring mechanism comprises a stationary supply hopper 2 having a lower discharge opening directed downwardly toward an agitator casing 3 which rests upon a stationary top plate 5, see Figs. 3 and 4. Disposed within the casing 3 is an oscillatory agitator 4 which is supported on pivots 36 one of which is provided with an actuating crank 35. An annular series of five material measuring pockets of variable volume, is formed within the rotary elements 6, 7, the upper element 6 coacting with the lower surface of the top plate 5, and the lower element 7 resting upon a stationary compression plate 8. The measuring pockets formed by the elements 6, 7, are successively movable beneath the agitator 4 and the hopper 2, and the plate 8 is provided with a fixed depression 42 having an inclined surface formed to automatically compress the charge in each pocket as it advances from beneath the agitator 4. The top plate 5 is fixed against rotation by means of a stop 63, but is vertically adjustable with the element 6 and with the agitator and supply hopper, by means of an adjusting screw 40 coacting with a fixed column 37 and with a sleeve 39 formed integral with the top plate 5, the screw 40 being manipulable by means of a hand wheel 41. The top plate 5 is also provided with a recess 43 and with a removable cover 44. The rotary element 7 is not movable vertically with the upper element 6, but is rotatable upon the plate 8 and about an enlarged bearing portion 38 of the fixed column 37, by means of gear teeth 28 formed on the periphery of the element 7. The bottom of the element 7 is provided with perforations 57 which permit liquid to pass into the recesses 70, and the compression plate 8 is secured to the bottom of a receptacle 9 which is mounted upon an inclined support 11 of the upper frame 10 and has an overflow 66 provided with a stand pipe 67. The compression plate 8 and the support thereof are provided with a discharge opening 45 located above the level of the liquid in the receptacle 9.

Figure 8:
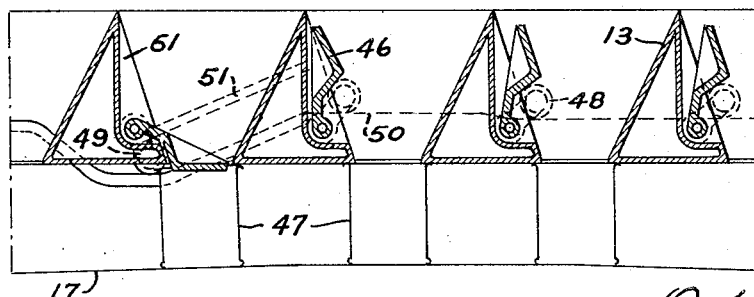
Fig. 8 is a development of the final discharge funnels of the improved tomato filler.

The material delivery mechanism comprises a member 13 rotatable about an upright shaft 14, and forming an annular series of four funnels which are successively movable beneath the discharge opening 45 of the receptacle 9. Each of the delivery funnels is provided with a recess 61 within which an oscillatory topping plunger 46 may be disposed. The plungers 46 are supported by pivots each of which is provided with an actuating lever 49 the outer end of which carries a roller 48. The rollers 48 coact with a stationary actuating track 50 and with a stationary upper track 51, to periodically oscillate the plungers 46 during revolution of the funnels as shown in Fig. 8. The tracks 50, 51 are vertically adjustable to vary the position of the arcs of travel of the plungers 46, by means of adjusting mechanism 62.

Figure 6:
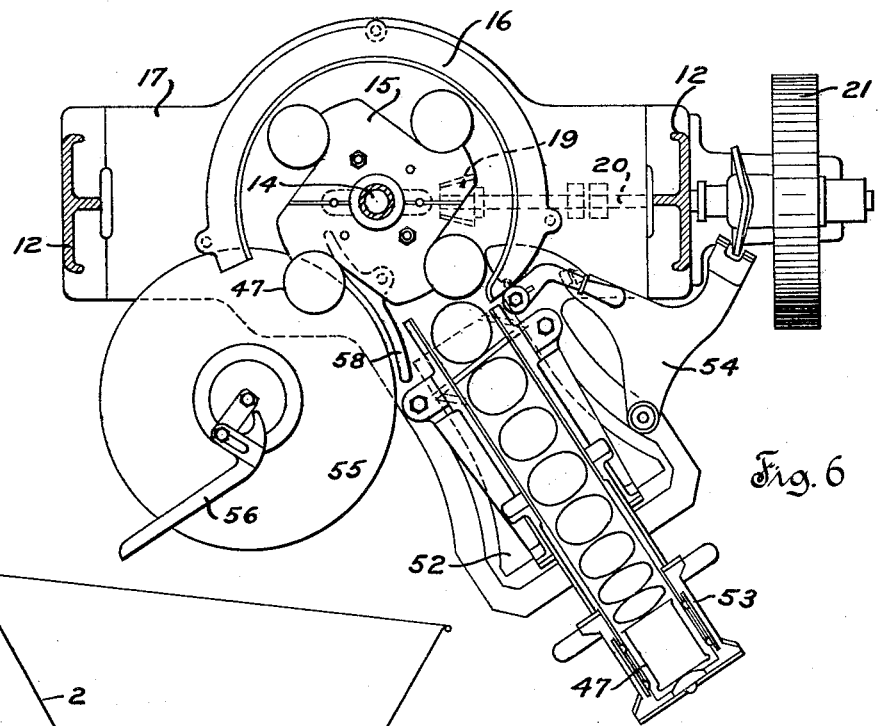
Fig. 6 is a top view of the can supply and transporting mechanism and of the main drive of the tomator filler.

The can transporting mechanism comprises a can supply chute 53 cooperating with a rotary feed drum 52 to deliver the successive cans 47 to the machine, a series of can hooks 15 rotatable within the stationary guide 16 to urge the cans 47 in succession along the supporting frame 17 and around the shaft 14, and a final discharge disk 55 and guides 58, 56 formed to deliver the successive filled cans 47 from the machine, see Fig. 6. The supporting frame 17 may be provided with an elevated can supporting surface for urging the successive cans 47 into close proximity with the lower ends of the funnels during the filling operation.

Figure 2:
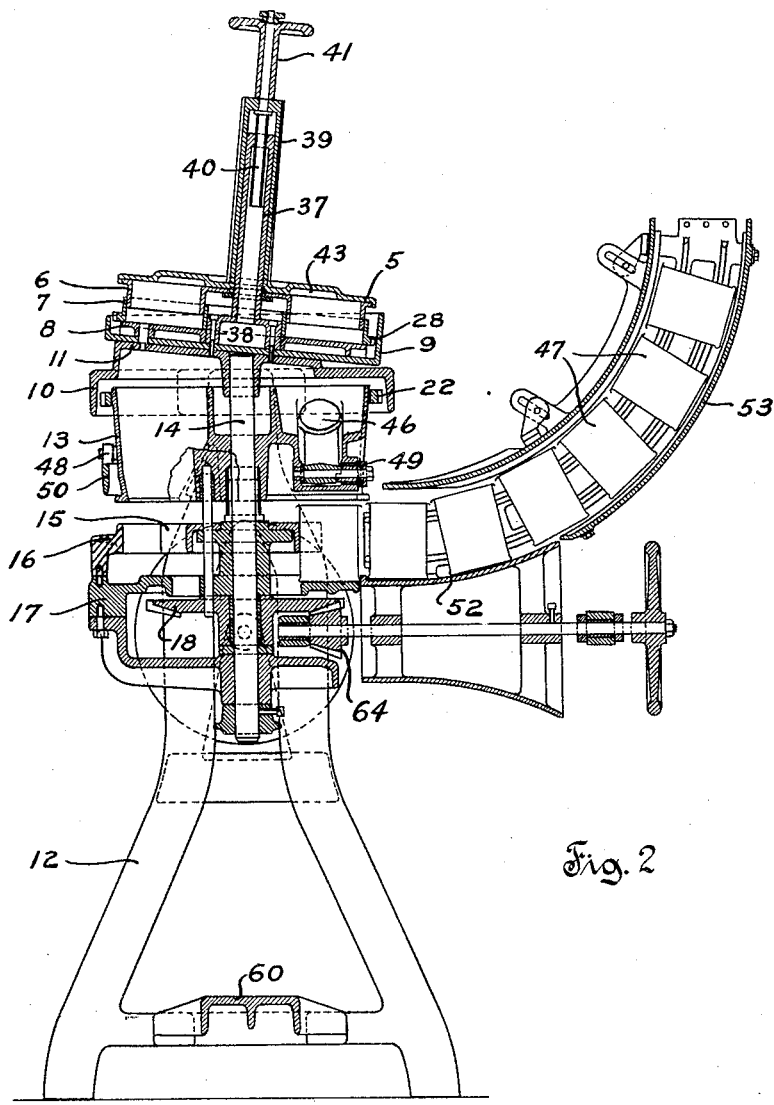
Fig. 2 is a central vertical section through the improved tomato filler, the section being taken through the can supply chute.

The means for driving the movable elements of the machine, comprises a horizontal power shaft 20 mounted in bearings in the frame 17 and having a driving pulley 21 at its outer end. The pulley 21 may be drivingly connected with the shaft 20 by means of a clutch which is controllable by means of automatic stop mechanism 54 which is adapted to stop the machine if the supply of cans 47 is interrupted. The inner end of the shaft 20 is provided with a pinion 19 which meshes with the main gear 18 secured to the upright shaft 14. From the gear 18, motion is transmitted directly to the can feed drum 52 through a pinion 64 and to the can discharge disk 55 through peripheral spur gear teeth on the gear 18. Rotary motion is also transmitted from the gear 18 to the can hooks 15 and to the funnel member 13 by means of the shaft 14 and vertical driving rods, as shown in Fig. 2. The rotary funnel member 13 is provided with an integral ring gear 22 which meshes with a spur gear 23 secured to the lower end of the counter shaft 24, the shaft 24 being rotatably supported in a frame 65 secured to the upper frame 10. A spur gear 27 secured to the upper end of the counter shaft 24, meshes with the teeth 28 of the lower pocket element 7, as shown in Fig. 5, thus imparting rotary motion to the elements 6, 7. Another spur gear 25 secured to the medial portion of the counter shaft 24, meshes with a pinion 26 secured to the lower end of a stub shaft 29, the upper end of which carries an eccentric 30, see Figs. 3 and 4. The eccentric 30 is operatively connected with a horizontally swingable lever 32 by means of a link 31, and the lever 32 is provided with an adjusting screw 33. A longitudinally split connection 34, the divisions of which are held together by means of thumb screws 59, has one end connected with the screw 33, and has its opposite end connected with the agitator lever 35, by means of universal connections as shown in Figs. 3 and 4.

The frame structure for supporting the various mechanisms and elements, comprises the upper frame 10, the cam supporting frame 17, a lower frame 60, and a pair of side frames 12. The auxiliary frame 65 is supported directly by the upper frame 10, and the intermediate cross frame 17 is provided with suitable supports for the can feed drum 52 and for the discharge disk 55. The intermediate cross frame 17 also provides bearings for the power shaft 20 and for the vertical driving shaft 14.

During normal operation of the improved can filling machine, the various elements are being operated by the application of power to the pulley 21, and cans 47 are being transported in succession to, through and from the machine. The mixture of whole tomatoes and juice is deposited in the supply hopper 2 and the constantly oscillating agitator 4 gently dribbles and urges the tomatoes delivered therethrough into the successive measuring pockets formed by the elements 6, 7. As the successive filled measuring pockets are urged downwardly beneath the cover plate 5 and along the upwardly inclined compression surface of the plate 8 toward the accumulated juice in the basin of receptacle 9, the tomatoes are squeezed vertically and are thereby spread laterally within the pockets so as to practically fill the pockets and to avoid rupturing the seed cells and thus maintain the objects in whole condition. The successive pockets are subsequently passed through the receptacle 9 and measured quantities of juice are simultaneously picked up by the recesses 70 adjoining the pockets through the openings 57, after which they are again caused to travel up the inclined upper surface of the plate 8 toward the discharge opening 45. Upon reaching the discharge opening 45, the successive measured batches of tomatoes in the pockets and juice in the adjoining recesses 70, are delivered by gravity into the funnels below.

The successive cans 47 are positioned and transported beneath the successive delivery funnels in line with the funnel discharge orifices. The measured batches of material received through the opening 45, therefore pass directly through the funnels into the cans 47. As the funnels advance about the axis of the shaft 14, following the delivery of a charge of material therethrough, the rollers 48 carried by the actuating levers 49, swing the plungers 46 about their pivotal axes and cause these plungers to urge any material which remains within the funnels through the discharge orifices thereof, and into the cans 47. The plungers 46 then enter the successive cans 47 and top the charges of material therein, whereupon the filled cans 47 are discharged from the filler by the discharge disk 55 and the can guides 58, 56. It will be noted from the foregoing description, that the improved can filling machine normally functions to automatically fill the successive cans 47 with accurately measured equal batches of whole tomatoes and juice, without crushing or rupturing the seed cells.

When it becomes desirable to vary the amount of agitation, it is merely necessary to turn the threaded adjusting rod 33 by means of the hand wheel thereon, thereby changing the effective throw of the lever 32. It is necessary when handling green tomatoes, to more violently agitate the entering material, than when ripe tomatoes are being packed, as the former product will stand violent agitation without crushing and requires such treatment in order to obtain proper filling of the measuring pockets. The oscillating agitator 4 automatically elongates and dribbles the large tomatoes into the moving measuring pockets, and due to the formation of the side walls of the agitator, the product treated will not be undesirably crushed when the speed of oscillation has been properly fixed by adjustment of the rod 33. By releasing the thumb screws 59, the connecting link 34 may be freely removed, thereby disconnecting the agitator 4 from its driving mechanism.

If it becomes desirable to vary the volumes of the measuring pockets in order to vary the measured quantities of material delivered to the cans 47, it is only necessary to adjust the hand wheel 41 and the threaded rod 40. Depending upon the direction of rotation of the hand wheel 41, the upper pocket element 6 and the elements supported thereby including the top plate 5, agitator 4 and hopper 2, may be raised or lowered to simultaneously vary the volumes of all of the measuring pockets. The lower pocket element 7 and the drive associated therewith are not disturbed by such volume adjustment, and the stop 63 for the stationary upper elements permits raising and lowering thereof during volume adjustment of the measuring pockets.

The limits of swing of the topping plungers 46 may also be readily varied by means of the adjusting mechanism 62 which supports the plunger actuating tracks 50, 51. These various adjustments may be made during normal operation of the machine and obviously provide great flexibility in operation so that various operating conditions can be fulfilled.

The use of a non-adjustable or rigid compression plate 8, simplifies the construction and prevents undesirable accumulation of pulp in the machine. It has been found in actual practice that more accurate filling is possible by retaining the degree of compression constant and by varying the amount of agitation, than by varying the degree of compression as by changing the inclination of the compression surfaces of the depression 42. If different kinds of material are to be treated, a plate 8 properly formed for the treatment of a specific commodity may be readily inserted in the machine.

Figure 7:
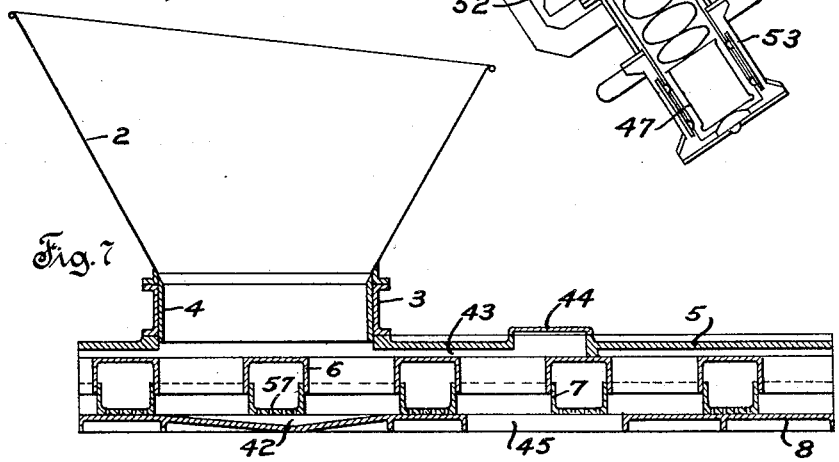
Fig. 7 is a development of the supply hopper and measuring pockets of the improved tomato filler.

By disposing the discharge opening 45 above the normal level of the liquid within the receptacle 9, all of the juice is permitted to flow into the receptacle 9 and homogeneous batches of mixture are produced. Besides the liquid contained in the successive measuring pockets with the solids, a predetermined quantity of juice is removed from the receptacle 9 by the recesses formed in the lower element 7 between the successive measuring pockets, and is delivered through the discharge opening 45 by virtue of the perforations 57 as shown in Fig. 7. The quantities of liquid thus delivered to each can 47 are equal and of definite volume, and the measuring recesses are formed in the measuring element 7 adjoining the measuring pockets, so that no special or separate liquid measuring device is required. The excess juice delivered to the receptacle 9 passes through the perforations 69 and over the stand pipe 67 to the overflow 66. The stand pipe 67 is vertically adjustable to vary the level of the liquid in the receptacle 9, and thus vary the quantity of juice delivered to each can.

The entire structure may also be readily dismantled for inspection and cleaning, and quickly re-assembled. By removing the hand wheel 41, and releasing the connection 34, the hopper 2, agitator casing 3, top plate 5, pocket elements 6, 7, compression plate 8, and receptacle 9 may be freely removed in succession. The gearing for driving the various elements is also freely accessible and removable and provides an extremely compact and efficient drive for the machine. The entire structure is relatively simple and compact in construction and effectively performs its function to produce a sanitary pack of extremely high quality.

It should be understood that it is not desired to limit the invention to the exact details of construction and operation herein shown and described for various modifications within the scope of the claims may occur to persons skilled in the art.

It is claimed and desired to secure by Letters Patent:—

1. In a can filling machine, means forming a liquid receptacle, means forming an annular series of measuring pockets revolvable about an inclined axis to successively enter and leave the liquid in said receptacle, means for delivering juice laden solid material into each of said pockets while advancing toward said liquid, a compression plate having an inclined surface formed to express surplus juice from the admitted solid material into said receptacle while each pocket enters said liquid, and means for effecting delivery of said material and juice admitted to said receptacle from each of said pockets after they leave said liquid.

2. In a can filling machine, means forming a pocket revolvable about an axis, a hopper for delivering material toward said pocket, and an oscillatory agitator between said hopper and said pocket, said agitator comprising a yoke movable laterally and longitudinally of the path of travel of material therethrough to knead pliable objects into said pocket while in motion.

3. In a can filling machine, means forming a pocket revolvable about an axis, oscillatory means movable laterally and longitudinally of the path of travel of the material to knead and dribble pliable objects contained in said material into said pocket, and means for spreading said objects laterally after delivery thereof into said pockets by said oscillatory means.

4. In a can filling machine, means forming a pocket revolvable about an axis, an oscillatory yoke in proximity to said pocket, means for delivering pliable objects to said pocket through said yoke, the feeding surfaces of said yoke being movable laterally and longitudinally of the path of travel of said objects, and fixed means cooperating with said pocket while in motion for spreading the admitted objects laterally within said pocket.

5. In a can filling machine, means forming a movable measuring pocket, an agitator oscillatable in proximity to said pocket to admit pliable objects thereto, an eccentric rotatable about an axis, and a motion transmitting connection between said eccentric and said agitator comprising means for varying the extent of oscillation of said agitator while avoiding variation of the eccentric throw.

6. In a can filling machine, means forming a movable measuring pocket, a yoke oscillatable about an axis in proximity to said pocket, a lever for oscillating said yoke, a second lever of variable effective throw for moving said first mentioned lever, and an eccentric of fixed throw for oscillating said second lever.

7. In a can filling machine, means forming a series of measuring pockets revolvable about an axis, an agitator movable in proximity to said pockets to admit material thereto, and common driving means for simultaneously oscillating said agitator and revolving said pockets, said means comprising a counter shaft, gearing direct connecting said shaft and said pocket forming means, and a series of levers and links connecting said shaft and said agitator.

8. In a can filling machine, a material supply hopper, a liquid receptacle, means forming an annular series of complementary sets of solids and liquid measuring pockets, means for advancing the successive pockets past said hopper and through said receptacle, and means for effecting delivery of material measured by said pockets to successive cans of a series.

9. In a can filling machine, a lower element forming an annular series of measuring pockets and an intervening series of liquid confining recesses, an upper element adjustably associated with said lower element to vary the capacity of said measuring pockets, means for delivering solid material to successive pockets of said series, and means for delivering liquid to successive recesses of said series.

10. In a can filling machine, a single rotary element forming an annular series of measuring pockets for pliable solid material and an intervening series of liquid measuring recesses, means for feeding pliable solids to said pockets, means for delivering liquid to said recess, and means for effecting simultaneous delivery of material from complementary pockets and recesses of said series.

11. In a can filling machine, a movable measuring pocket, means for supporting a can beneath said pocket, a funnel for conducting material from said pocket to said can, and a plunger swingable within said funnel while in motion.

12. In a can filling machine, a measuring pocket movable about an axis, a funnel movable about said axis beneath said pocket, and a plunger swingable within said funnel during movement thereof about said axis.

13. In a can filling machine, a series of measuring pockets movable about an axis, a series of funnels movable about said axis beneath said pockets, a plunger swingable within each of said funnels, and an adjustable track cooperable with said plungers to swing the same during movement of said funnels about said axis.

14. In a can filling machine, a stationary hopper, an agitator oscillatable across and along the delivery opening of said hopper, a stationary top plate pivotally supporting said agitator, a pocket forming element movable beneath said top plate, and means for simultaneously moving said stationary and movable elements to vary the volume of the pockets formed by said movable element.

15. In a can filling machine, a hopper, an agitator oscillatable across and along the delivery opening of said hopper, a stationary top plate, supporting said hopper and said agitator, pocket forming elements movable beneath said top plate, and a compression plate supporting said movable elements and located directly beneath said agitator.

16. In a can filling machine, a pocket movable about an axis, a yoke swingable about a substantially horizontal axis to urge pliable objects downwardly into said pocket, and means having an inclined surface for compressing said objects upwardly within said pocket while in motion.

17. In a can filling machine, a movable pocket, means swingable about a substantially horizontal axis to urge pliable objects downwardly into said pocket, and means for compressing said objects upwardly within said pocket while in motion.

In testimony whereof, the signature of the inventor is affixed hereto.

OSWALD H. HANSEN.